US011021393B2

(12) United States Patent
Oram et al.

(10) Patent No.: US 11,021,393 B2
(45) Date of Patent: Jun. 1, 2021

(54) DEEP NON-FRANGIBLE STRESS PROFILES AND METHODS OF MAKING (71) Applicant: CORNING INCORPORATED, Corning, NY (US)

(72) Inventors: Pascale Oram, Hammondsport, NY (US); Rostislav Vatchev Roussev, Painted Post, NY (US); Vitor Marino Schneider, Painted Post, NY (US); Emily Elizabeth Young, San Jose, CA (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 16/296,773

(22) Filed: Mar. 8, 2019

(65) Prior Publication Data
US 2019/0202735 A1   Jul. 4, 2019

Related U.S. Application Data (62) Division of application No. 14/932,411, filed on Nov. 4, 2015, now Pat. No. 10,239,784.

(60) Provisional application No. 62/074,872, filed on Nov. 4, 2014.

(51) Int. Cl.
C03C 21/00 (2006.01)
C03C 3/097 (2006.01)

(52) U.S. Cl.
CPC ............ C03C 21/002 (2013.01); C03C 3/097 (2013.01)

(58) Field of Classification Search
CPC .................................................. C03C 21/002
See application file for complete search history.

(56) References Cited

U.S. PATENT DOCUMENTS

| | | | |
|---|---|---|---|
| 1,960,121 A | 5/1934 | Moulton | |
| 3,107,196 A | 10/1963 | Acloque | |
| 3,287,200 A | 11/1966 | Hess et al. | |
| 3,357,876 A | 12/1967 | Welling | |
| 3,380,818 A | 4/1968 | Smith | |
| 3,404,015 A | 10/1968 | Dumbaugh, Jr. | |
| 3,410,673 A * | 11/1968 | Marusak | C03C 21/002 65/30.14 |
| 3,433,611 A * | 3/1969 | Saunders | C03C 21/002 65/30.14 |
| 3,464,880 A | 9/1969 | Rinehart | |
| 3,489,097 A | 1/1970 | Gemeinhardt | |
| 3,490,984 A | 1/1970 | Petticrew et al. | |
| 3,625,718 A | 12/1971 | Petticrew | |
| 3,639,198 A | 2/1972 | Plumat et al. | |
| 3,656,923 A | 4/1972 | Garfinkel et al. | |
| 3,660,060 A | 5/1972 | Spanoudis | |
| 3,673,049 A | 6/1972 | Giffen et al. | |
| 3,737,294 A | 6/1973 | Dumbaugh et al. | |
| 3,746,526 A | 7/1973 | Giffon | |
| 3,765,855 A | 10/1973 | Larrick | |
| 3,798,013 A | 3/1974 | Hasegawa et al. | |
| 3,811,855 A | 5/1974 | Stockdale et al. | |
| 3,844,754 A | 10/1974 | Grubb et al. | |
| 3,879,183 A | 4/1975 | Carlson | |
| 3,907,577 A | 9/1975 | Kiefer et al. | |
| 3,931,438 A | 1/1976 | Beall et al. | |
| 3,936,287 A | 2/1976 | Beall et al. | |
| 3,958,052 A | 5/1976 | Galusha et al. | |
| 3,959,000 A | 5/1976 | Nakagawa et al. | |
| 4,042,405 A | 8/1977 | Krohn et al. | |
| 4,053,679 A | 10/1977 | Rinehart | |
| 4,055,703 A | 10/1977 | Rinehart | |
| 4,102,664 A | 7/1978 | Dumbaugh, Jr. | |
| 4,130,437 A | 12/1978 | Mazeau et al. | |
| 4,148,661 A | 4/1979 | Kerko et al. | |
| 4,156,755 A | 5/1979 | Rinehart | |
| 4,190,451 A | 2/1980 | Hares et al. | |
| 4,214,886 A | 7/1980 | Shay et al. | |

(Continued)

FOREIGN PATENT DOCUMENTS

AU    6452265 A    10/1965
AU   2011212982 A1   8/2012
(Continued)

OTHER PUBLICATIONS

Japanese Patent Application No. 2017523958; Machine Translation of the Office Action dated Oct. 9, 2019; Japan Patent Office; 5 Pgs.
Aegerter et al; "Sol-gel technologies for glass producers and users Chapter 4.1.8 Scratch resistant coatings (G. Helsch and G. H. Frischat)", pp. 217-221, Kluwer Academic Publishers, 2004.
Amin et al; U.S. Appl. No. 14/926,425, filed Oct. 29, 2015, Titled "Strengthened Glass With Ultra-Deep Depth of Compression".
ASTM C1279-13 "Standard Test Method for Non-Destructive Photoelastic Measurement of Edge and Surface Stresses in Annealed, Heat-Strengthened, and Fully Tempered Flat Glass"; Downloaded Jan. 24, 2018; 11 Pages.
ASTM C1422/C1422M-10 "Standard Specification for Chemically Strengthened Flat Glass"; Downloaded Jan. 24, 2018; 5 pages.
(Continued)

Primary Examiner — Robert C Boyle
(74) Attorney, Agent, or Firm — Jeffrey A. Schmidt (57) ABSTRACT A non-frangible glass article strengthened by a dual or two-step ion exchange (IOX) process, where the first IOX step leads to a depth of compressive layer FSM_DOL>0.1·t or, in some embodiments, FSM_DOL>0.15·t, where t is the thickness of the glass, is provided. The glass article has a compressive stress CS1 after the first IOX step at the surface of from 100 MPa to 400 MPa or, in some embodiments, from 150 MPa to 300 MPa. The first IOX step is followed by a second IOX step, leading to a "spike" compressive stress CS2 after the second IOX step at the surface of greater than 500 MPa or, in some embodiments, 700 MPa. The width of the spike generated by the second IOX is between 1 µm and 30 µm, or between 8 µm and 15 µm, using the criteria where the magnitude (absolute value) of the slope of the spike is higher than 20 MPa/µm.

12 Claims, 6 Drawing Sheets (56) References Cited

U.S. PATENT DOCUMENTS

| | | |
|---|---|---|
| 4,240,836 A | 12/1980 | Borrelli et al. |
| 4,242,117 A | 12/1980 | Van Ass |
| 4,358,542 A | 11/1982 | Hares et al. |
| 4,407,966 A | 10/1983 | Kerko et al. |
| 4,468,534 A | 8/1984 | Boddicker |
| 4,471,024 A | 9/1984 | Pargamin et al. |
| 4,483,700 A | 11/1984 | Forker et al. |
| 4,537,612 A | 8/1985 | Borrelli et al. |
| 4,608,349 A | 8/1986 | Kerko et al. |
| 4,702,042 A | 10/1987 | Herrington et al. |
| 4,726,981 A | 2/1988 | Pierson et al. |
| 4,736,981 A | 4/1988 | Barton et al. |
| 4,757,162 A | 7/1988 | Dumora et al. |
| 4,857,485 A | 8/1989 | Brennan et al. |
| 5,270,269 A | 12/1993 | Hares et al. |
| 5,273,827 A | 12/1993 | Francis |
| 5,322,819 A | 6/1994 | Araujo et al. |
| 5,342,426 A | 8/1994 | Dumbaugh, Jr. |
| 5,350,607 A | 9/1994 | Tyson et al. |
| 5,559,060 A | 9/1996 | Dumbaugh et al. |
| 5,763,343 A | 6/1998 | Brix et al. |
| 5,773,148 A | 6/1998 | Charrue et al. |
| 5,804,317 A | 9/1998 | Charrue |
| 5,895,768 A | 4/1999 | Speit |
| 5,972,460 A | 10/1999 | Tachiwana |
| 6,111,821 A | 8/2000 | Bach |
| 6,187,441 B1 | 2/2001 | Takeuchi et al. |
| 6,333,286 B1 | 12/2001 | Kurachi et al. |
| 6,376,402 B1 | 4/2002 | Pannhorst et al. |
| 6,413,892 B1 | 7/2002 | Koyama et al. |
| 6,440,531 B1 | 8/2002 | Kurachi et al. |
| 6,472,068 B1 | 10/2002 | Glass et al. |
| 6,516,634 B1 | 2/2003 | Green et al. |
| 6,518,211 B1 | 2/2003 | Bradshaw et al. |
| 6,528,440 B1 | 3/2003 | Vilato et al. |
| 6,537,938 B1 | 3/2003 | Miyazaki |
| 6,607,999 B2 | 8/2003 | Hachitani |
| 6,689,704 B2 | 2/2004 | Ota et al. |
| 6,846,760 B2 | 1/2005 | Siebers et al. |
| 7,007,512 B2 | 3/2006 | Kamada et al. |
| 7,091,141 B2 | 8/2006 | Horsfall et al. |
| 7,176,528 B2 | 2/2007 | Couillard et al. |
| 7,476,633 B2 | 1/2009 | Comte et al. |
| 7,514,149 B2 | 4/2009 | Bocko et al. |
| 7,531,475 B2 | 5/2009 | Kishimoto et al. |
| 7,619,283 B2 | 11/2009 | Gadkaree |
| 7,666,511 B2 | 2/2010 | Ellison et al. |
| 7,687,419 B2 | 3/2010 | Kawai |
| 7,727,917 B2 | 6/2010 | Shelestak et al. |
| 7,838,136 B2 | 11/2010 | Nakashima et al. |
| 7,891,212 B2 | 2/2011 | Isono |
| 8,007,913 B2 | 8/2011 | Coppola et al. |
| 8,075,999 B2 | 12/2011 | Barefoot et al. |
| 8,099,982 B2 | 1/2012 | Takagi et al. |
| 8,158,543 B2 | 2/2012 | Dejneka et al. |
| 8,143,179 B2 | 3/2012 | Aitken et al. |
| 8,193,128 B2 | 6/2012 | Hellmann et al. |
| 8,232,218 B2 | 7/2012 | Dejneka et al. |
| 8,252,708 B2 | 8/2012 | Morena et al. |
| 8,312,739 B2 | 11/2012 | Lee et al. |
| 8,312,789 B2 | 11/2012 | Beck |
| 8,327,666 B2 | 12/2012 | Harvey et al. |
| 8,347,651 B2 | 1/2013 | Abramov et al. |
| 8,349,455 B2 | 1/2013 | Kondo et al. |
| 8,415,013 B2 | 4/2013 | Barefoot et al. |
| 8,431,502 B2 | 4/2013 | Dejneka et al. |
| 8,561,429 B2 | 10/2013 | Allan et al. |
| 8,580,411 B2 | 11/2013 | Endo et al. |
| 8,586,492 B2 | 11/2013 | Barefoot et al. |
| 8,623,776 B2 | 1/2014 | Dejneka et al. |
| 8,652,978 B2 | 2/2014 | Dejneka et al. |
| 8,656,734 B2 | 2/2014 | Zou et al. |
| 8,691,711 B2 | 4/2014 | Nakashima et al. |
| 8,697,592 B2 | 4/2014 | Ikenishi et al. |
| 8,713,972 B2 | 5/2014 | Lakota et al. |
| 8,756,262 B2 | 6/2014 | Zhang |
| 8,759,238 B2 | 6/2014 | Chapman et al. |
| 8,765,262 B2 | 7/2014 | Gross |
| 8,778,820 B2 | 7/2014 | Gomez et al. |
| 8,783,063 B2 | 7/2014 | Osakabe et al. |
| 8,802,581 B2 | 8/2014 | Dejneka et al. |
| 8,854,623 B2 | 10/2014 | Fontaine et al. |
| 8,932,510 B2 | 1/2015 | Li et al. |
| 8,943,855 B2 | 2/2015 | Gomez et al. |
| 8,946,103 B2 | 2/2015 | Dejneka et al. |
| 8,950,215 B2 | 2/2015 | Rappoport et al. |
| 8,951,927 B2 | 2/2015 | Dejneka et al. |
| 8,957,374 B2 | 2/2015 | Liu et al. |
| 8,969,226 B2 | 3/2015 | Dejneka et al. |
| 8,975,374 B2 | 3/2015 | Kimura |
| 9,003,835 B2 | 4/2015 | Lock |
| 9,007,878 B2 | 4/2015 | Matsumoto et al. |
| 9,139,469 B2 | 9/2015 | Comte et al. |
| 9,140,543 B1 | 9/2015 | Allan et al. |
| 9,156,724 B2 | 10/2015 | Gross |
| 9,193,625 B2 | 11/2015 | Bookbinder et al. |
| 9,212,288 B2 | 12/2015 | Fujiwara et al. |
| 9,272,945 B2 | 3/2016 | Smith |
| 9,290,407 B2 | 3/2016 | Barefoot et al. |
| 9,290,413 B2 | 3/2016 | Dejneka et al. |
| 9,339,993 B2 | 5/2016 | Cites et al. |
| 9,346,703 B2 | 5/2016 | Bookbinder et al. |
| 9,359,251 B2 | 6/2016 | Bookbinder et al. |
| 9,487,434 B2 | 11/2016 | Amin et al. |
| 9,498,822 B2 | 11/2016 | Brandt et al. |
| 9,499,431 B2 | 11/2016 | Barefoot et al. |
| 9,567,254 B2 | 2/2017 | Amin et al. |
| 9,593,042 B2 | 3/2017 | Hu et al. |
| 9,604,876 B2 | 3/2017 | Gy et al. |
| 9,676,663 B2 | 6/2017 | Amin et al. |
| 9,701,569 B2 | 7/2017 | Demartino et al. |
| 9,751,802 B2 | 9/2017 | Allan et al. |
| 9,902,648 B2 | 2/2018 | Amin et al. |
| 9,908,810 B2 | 3/2018 | Amin et al. |
| 9,908,811 B2 | 3/2018 | Gross et al. |
| 9,977,470 B2 | 5/2018 | Demartino et al. |
| 10,118,858 B2 | 11/2018 | Amin et al. |
| 10,144,670 B2 | 12/2018 | Akatsuka et al. |
| 10,150,698 B2 | 12/2018 | Amin et al. |
| 10,160,688 B2 | 12/2018 | Amin et al. |
| 10,239,784 B2 | 3/2019 | Oram et al. |
| 2005/0090377 A1 | 4/2005 | Shelestak et al. |
| 2005/0099618 A1 | 5/2005 | Difoggio et al. |
| 2005/0221044 A1 | 10/2005 | Gaume et al. |
| 2005/0250639 A1 | 11/2005 | Siebers et al. |
| 2006/0127679 A1 | 6/2006 | Gulati et al. |
| 2006/0279217 A1 | 12/2006 | Peuchert et al. |
| 2007/0060465 A1 | 3/2007 | Varshneya et al. |
| 2007/0123410 A1 | 5/2007 | Morena et al. |
| 2007/0218262 A1 | 9/2007 | Degand et al. |
| 2008/0026927 A1 | 1/2008 | Monique Comte |
| 2008/0128953 A1 | 6/2008 | Nagai et al. |
| 2008/0241603 A1 | 10/2008 | Isono |
| 2008/0286548 A1 | 11/2008 | Ellison et al. |
| 2009/0142568 A1 | 6/2009 | Dejneka et al. |
| 2009/0197088 A1 | 8/2009 | Murata |
| 2009/0215607 A1 | 8/2009 | Dejneka et al. |
| 2009/0220761 A1 | 9/2009 | Dejneka et al. |
| 2010/0003508 A1 | 1/2010 | Arrouy et al. |
| 2010/0009154 A1 | 1/2010 | Allan et al. |
| 2010/0028607 A1 | 2/2010 | Lee et al. |
| 2010/0029460 A1 | 2/2010 | Shojiya et al. |
| 2010/0035038 A1 | 2/2010 | Barefoot et al. |
| 2010/0035745 A1 | 2/2010 | Murata |
| 2010/0087307 A1 | 4/2010 | Murata et al. |
| 2010/0112341 A1 | 5/2010 | Takagi et al. |
| 2010/0119846 A1 | 5/2010 | Sawada |
| 2010/0190038 A1 | 7/2010 | Osakabe et al. |
| 2010/0200804 A1 | 8/2010 | Woodruff et al. |
| 2010/0210422 A1 | 8/2010 | Crawford |
| 2010/0210442 A1 | 8/2010 | Abramov et al. |
| 2010/0215996 A1 | 8/2010 | Wendling et al. |
| 2010/0291353 A1 | 11/2010 | Dejneka et al. |
| 2010/0326657 A1 | 12/2010 | Hellmann et al. |

(56) References Cited

U.S. PATENT DOCUMENTS

| | | |
|---|---|---|
| 2011/0014475 A1 | 1/2011 | Murata |
| 2011/0064951 A1 | 3/2011 | Fujiwara et al. |
| 2011/0067447 A1 | 3/2011 | Zadesky et al. |
| 2011/0092353 A1 | 4/2011 | Amin et al. |
| 2011/0165393 A1 | 7/2011 | Bayne et al. |
| 2011/0201490 A1 | 8/2011 | Barefoot et al. |
| 2011/0226832 A1 | 9/2011 | Bayne et al. |
| 2011/0281093 A1 | 11/2011 | Gulati et al. |
| 2011/0293942 A1 | 12/2011 | Cornejo et al. |
| 2011/0294648 A1 | 12/2011 | Chapman et al. |
| 2011/0294649 A1 | 12/2011 | Gomez et al. |
| 2012/0015150 A1 | 1/2012 | Suzuki |
| 2012/0021898 A1 | 1/2012 | Elam et al. |
| 2012/0040146 A1 | 2/2012 | Garner et al. |
| 2012/0048604 A1 | 3/2012 | Cornejo et al. |
| 2012/0052271 A1 * | 3/2012 | Gomez .................. C03C 3/095 428/213 |
| 2012/0052275 A1 | 3/2012 | Hashimoto et al. |
| 2012/0083401 A1 | 4/2012 | Koyama et al. |
| 2012/0114955 A1 | 5/2012 | Almoric et al. |
| 2012/0135153 A1 | 5/2012 | Osakabe et al. |
| 2012/0135226 A1 | 5/2012 | Bookbinder et al. |
| 2012/0171497 A1 | 7/2012 | Koyama et al. |
| 2012/0189843 A1 | 7/2012 | Chang et al. |
| 2012/0194974 A1 | 8/2012 | Weber et al. |
| 2012/0196110 A1 | 8/2012 | Murata et al. |
| 2012/0216569 A1 | 8/2012 | Allan et al. |
| 2012/0219792 A1 | 8/2012 | Yamamoto et al. |
| 2012/0236526 A1 | 9/2012 | Weber |
| 2012/0264585 A1 | 10/2012 | Ohara et al. |
| 2012/0297829 A1 | 11/2012 | Endo et al. |
| 2012/0308827 A1 | 12/2012 | Boek et al. |
| 2012/0321898 A1 | 12/2012 | Meinhardt et al. |
| 2013/0004758 A1 | 1/2013 | Dejneka et al. |
| 2013/0007458 A1 | 1/2013 | Wakita et al. |
| 2013/0017380 A1 | 1/2013 | Murata et al. |
| 2013/0045375 A1 | 2/2013 | Gross |
| 2013/0050992 A1 | 2/2013 | Schneider et al. |
| 2013/0101798 A1 | 4/2013 | Hashimoto |
| 2013/0122260 A1 | 5/2013 | Liang |
| 2013/0122284 A1 | 5/2013 | Gross |
| 2013/0183512 A1 | 7/2013 | Gy et al. |
| 2013/0186139 A1 | 7/2013 | Tanii |
| 2013/0189486 A1 | 7/2013 | Wang et al. |
| 2013/0202868 A1 | 8/2013 | Barefoot et al. |
| 2013/0203583 A1 | 8/2013 | Zhang et al. |
| 2013/0219966 A1 | 8/2013 | Hasegawa et al. |
| 2013/0224492 A1 * | 8/2013 | Bookbinder .......... C03C 23/007 428/410 |
| 2013/0236666 A1 | 9/2013 | Bookbinder et al. |
| 2013/0236699 A1 | 9/2013 | Prest et al. |
| 2013/0240025 A1 | 9/2013 | Bersano |
| 2013/0260154 A1 | 10/2013 | Allan et al. |
| 2013/0274085 A1 | 10/2013 | Beall et al. |
| 2013/0288001 A1 | 10/2013 | Murata et al. |
| 2013/0288010 A1 | 10/2013 | Akarapu et al. |
| 2013/0309613 A1 | 11/2013 | O'Malley et al. |
| 2013/0323444 A1 | 12/2013 | Ehemann et al. |
| 2014/0050911 A1 | 2/2014 | Mauro et al. |
| 2014/0063393 A1 | 3/2014 | Zhong et al. |
| 2014/0087159 A1 | 3/2014 | Cleary et al. |
| 2014/0087193 A1 | 3/2014 | Cites et al. |
| 2014/0087194 A1 | 3/2014 | Dejneka et al. |
| 2014/0090864 A1 | 4/2014 | Paulson |
| 2014/0092377 A1 | 4/2014 | Liu et al. |
| 2014/0093702 A1 | 4/2014 | Kitajima |
| 2014/0106141 A1 | 4/2014 | Bellman et al. |
| 2014/0106172 A1 | 4/2014 | Dejneka et al. |
| 2014/0109616 A1 | 4/2014 | Varshneya |
| 2014/0113141 A1 | 4/2014 | Yamamoto et al. |
| 2014/0134397 A1 | 5/2014 | Amin et al. |
| 2014/0139978 A1 | 5/2014 | Kwong |
| 2014/0141226 A1 | 5/2014 | Bookbinder et al. |
| 2014/0147576 A1 | 5/2014 | Lewis et al. |
| 2014/0150525 A1 | 6/2014 | Okawa et al. |
| 2014/0151370 A1 | 6/2014 | Chang et al. |
| 2014/0154661 A1 | 6/2014 | Bookbinder et al. |
| 2014/0170380 A1 | 6/2014 | Murata et al. |
| 2014/0193606 A1 | 7/2014 | Kwong |
| 2014/0220327 A1 | 8/2014 | Adib et al. |
| 2014/0227523 A1 | 8/2014 | Dejneka et al. |
| 2014/0227524 A1 | 8/2014 | Ellison et al. |
| 2014/0234607 A1 | 8/2014 | Matsuda et al. |
| 2014/0248495 A1 | 9/2014 | Matsuda et al. |
| 2014/0308526 A1 | 10/2014 | Chapman et al. |
| 2014/0321124 A1 | 10/2014 | Schneider et al. |
| 2014/0329660 A1 | 11/2014 | Barefoot et al. |
| 2014/0335330 A1 | 11/2014 | Bellman et al. |
| 2014/0356576 A1 | 12/2014 | Dejneka et al. |
| 2014/0356605 A1 | 12/2014 | Adib et al. |
| 2014/0364298 A1 | 12/2014 | Ohara et al. |
| 2014/0370264 A1 | 12/2014 | Ohara et al. |
| 2014/0370302 A1 | 12/2014 | Amin et al. |
| 2015/0004390 A1 | 1/2015 | Kawamoto et al. |
| 2015/0011811 A1 | 1/2015 | Pavone et al. |
| 2015/0027169 A1 | 1/2015 | Fredholm |
| 2015/0030834 A1 | 1/2015 | Morey et al. |
| 2015/0030838 A1 | 1/2015 | Sellier et al. |
| 2015/0037543 A1 | 2/2015 | Keegan et al. |
| 2015/0037586 A1 | 2/2015 | Gross |
| 2015/0044473 A1 | 2/2015 | Murata et al. |
| 2015/0060401 A1 | 3/2015 | Chang et al. |
| 2015/0064472 A1 | 3/2015 | Gross et al. |
| 2015/0064474 A1 | 3/2015 | Dejneka et al. |
| 2015/0079398 A1 | 3/2015 | Amin et al. |
| 2015/0093581 A1 | 4/2015 | Murata et al. |
| 2015/0111030 A1 | 4/2015 | Miyasaka et al. |
| 2015/0132563 A1 | 5/2015 | O'Malley et al. |
| 2015/0140325 A1 | 5/2015 | Gross et al. |
| 2015/0144291 A1 | 5/2015 | Brandt et al. |
| 2015/0147574 A1 | 5/2015 | Allan et al. |
| 2015/0147575 A1 | 5/2015 | Dejneka et al. |
| 2015/0147576 A1 | 5/2015 | Bookbinder et al. |
| 2015/0152003 A1 | 6/2015 | Kawamoto et al. |
| 2015/0157533 A1 | 6/2015 | Demartino et al. |
| 2015/0166401 A1 | 6/2015 | Yamamoto |
| 2015/0166407 A1 | 6/2015 | Varshneya et al. |
| 2015/0175469 A1 | 6/2015 | Tabe |
| 2015/0183680 A1 | 7/2015 | Barefoot et al. |
| 2015/0239775 A1 | 8/2015 | Amin et al. |
| 2015/0239776 A1 | 8/2015 | Amin et al. |
| 2015/0251947 A1 | 9/2015 | Lestrigant et al. |
| 2015/0259244 A1 | 9/2015 | Amin et al. |
| 2015/0261363 A1 | 9/2015 | Shah et al. |
| 2015/0274585 A1 | 10/2015 | Rogers et al. |
| 2015/0329418 A1 | 11/2015 | Murata et al. |
| 2015/0368148 A1 | 12/2015 | Duffy et al. |
| 2015/0368153 A1 | 12/2015 | Pesansky et al. |
| 2016/0102014 A1 | 4/2016 | Hu et al. |
| 2016/0107924 A1 | 4/2016 | Yamamoto et al. |
| 2016/0122239 A1 | 5/2016 | Amin et al. |
| 2016/0122240 A1 | 5/2016 | Oram et al. |
| 2016/0187994 A1 | 6/2016 | La et al. |
| 2016/0265368 A1 | 9/2016 | Bencini et al. |
| 2016/0318796 A1 | 11/2016 | Masuda |
| 2016/0333776 A1 | 11/2016 | Andersson et al. |
| 2017/0158556 A1 | 6/2017 | Dejneka et al. |
| 2017/0197869 A1 | 7/2017 | Beall et al. |
| 2017/0197870 A1 | 7/2017 | Finkeldey et al. |
| 2017/0291849 A1 | 10/2017 | Dejneka et al. |
| 2017/0295657 A1 | 10/2017 | Gross et al. |
| 2017/0305786 A1 | 10/2017 | Roussev et al. |

FOREIGN PATENT DOCUMENTS

| | | |
|---|---|---|
| CN | 1312582 A | 9/2001 |
| CN | 1759074 A | 4/2006 |
| CN | 1886348 A | 12/2006 |
| CN | 101316799 A | 12/2008 |
| CN | 101578240 A | 11/2009 |
| CN | 101583576 A | 11/2009 |
| CN | 101689376 A | 3/2010 |
| CN | 102026929 A | 4/2011 |
| CN | 102089252 A | 6/2011 |

(56) References Cited

FOREIGN PATENT DOCUMENTS

| | | |
|---|---|---|
| CN | 102131740 A | 7/2011 |
| CN | 102149649 A | 8/2011 |
| CN | 102363567 A | 2/2012 |
| CN | 102531384 A | 7/2012 |
| CN | 102690059 A | 9/2012 |
| CN | 102791646 A | 11/2012 |
| CN | 102815860 A | 12/2012 |
| CN | 102898022 A | 1/2013 |
| CN | 102958855 A | 3/2013 |
| CN | 103058506 A | 4/2013 |
| CN | 103058507 A | 4/2013 |
| CN | 103068759 A | 4/2013 |
| CN | 103097319 A | 5/2013 |
| CN | 103282318 A | 9/2013 |
| CN | 103338926 A | 10/2013 |
| CN | 103569015 A | 2/2014 |
| CN | 103946166 A | 7/2014 |
| CN | 104114503 A | 10/2014 |
| EP | 0132751 A1 | 2/1985 |
| EP | 0163873 A1 | 12/1985 |
| EP | 700879 A1 | 3/1996 |
| EP | 0931028 A1 | 7/1999 |
| EP | 1291631 A1 | 3/2003 |
| EP | 1314704 A1 | 5/2003 |
| EP | 1593658 A1 | 11/2005 |
| EP | 2263979 A1 | 12/2010 |
| EP | 2397449 A1 | 12/2011 |
| EP | 2415724 A1 | 2/2012 |
| EP | 2531459 A2 | 12/2012 |
| EP | 2540682 A1 | 1/2013 |
| EP | 2594536 A1 | 5/2013 |
| EP | 2609047 A1 | 7/2013 |
| EP | 2646243 A1 | 10/2013 |
| EP | 2666756 A1 | 11/2013 |
| EP | 2695734 A1 | 2/2014 |
| EP | 2762459 A1 | 8/2014 |
| GB | 1012367 A | 12/1965 |
| GB | 1026770 A | 4/1966 |
| GB | 1089912 A | 11/1967 |
| GB | 1334828 A | 10/1973 |
| JP | 47-004192 U | 9/1972 |
| JP | 54-083923 A | 7/1979 |
| JP | 07-263318 A | 10/1995 |
| JP | 11328601 A | 11/1999 |
| JP | 2000-203872 A | 7/2000 |
| JP | 2000-327365 A | 11/2000 |
| JP | 2002-358626 A | 12/2002 |
| JP | 2003-505327 A | 2/2003 |
| JP | 2003-283028 A | 10/2003 |
| JP | 2004-099370 A | 4/2004 |
| JP | 2004-259402 A | 9/2004 |
| JP | 2005-139031 A | 6/2005 |
| JP | 2005-206406 A | 8/2005 |
| JP | 2005-289683 A | 10/2005 |
| JP | 2005-289685 A | 10/2005 |
| JP | 2005-320234 A | 11/2005 |
| JP | 2006-228431 A | 8/2006 |
| JP | 2007-527354 A | 9/2007 |
| JP | 2007-252589 A | 10/2007 |
| JP | 2007-314521 A | 12/2007 |
| JP | 2008-007384 A | 1/2008 |
| JP | 2008-094713 A | 4/2008 |
| JP | 2008-115071 A | 5/2008 |
| JP | 2009-084076 A | 4/2009 |
| JP | 2009-107878 A | 5/2009 |
| JP | 2009099239 A | 5/2009 |
| JP | 2009-274902 A | 11/2009 |
| JP | 2010202514 A | 9/2010 |
| JP | 2011-057504 A | 3/2011 |
| JP | 2011213576 A | 10/2011 |
| JP | 2011-527661 | 11/2011 |
| JP | 2011-530470 A | 12/2011 |
| JP | 2013-502371 A | 1/2013 |
| JP | 2013-028512 A | 2/2013 |
| JP | 2013-529172 A | 7/2013 |
| JP | 2013-536155 A | 9/2013 |
| JP | 2014-501214 A | 1/2014 |
| JP | 2014-073953 A | 4/2014 |
| JP | 2014-136751 A | 7/2014 |
| JP | 2014-141363 A | 8/2014 |
| JP | 2015-511537 A | 4/2015 |
| JP | 2017-502188 A | 1/2017 |
| JP | 2017-502202 A | 1/2017 |
| KR | 10-2012-0128657 A | 11/2012 |
| KR | 10-1302664 B1 | 9/2013 |
| KR | 10-2013-0135840 A | 12/2013 |
| KR | 10-2014-0131558 A | 11/2014 |
| KR | 10-1506378 B1 | 3/2015 |
| KR | 10-2016-0080048 | 7/2016 |
| RU | 2127711 C1 | 3/1999 |
| SU | 1677028 A1 | 9/1991 |
| TW | 200911718 A | 3/2009 |
| TW | 201040118 A | 11/2010 |
| TW | 201313635 A | 4/2013 |
| TW | 201331148 A | 8/2013 |
| TW | 201335092 A | 9/2013 |
| TW | 201341324 A | 10/2013 |
| TW | 201402490 A | 1/2014 |
| TW | 201520178 A | 6/2015 |
| WO | 2000/047529 A1 | 8/2000 |
| WO | 2005091021 A1 | 9/2005 |
| WO | 2005/093720 A1 | 10/2005 |
| WO | 2009/041348 A1 | 4/2009 |
| WO | 2010/002477 A1 | 1/2010 |
| WO | 2010005578 A1 | 1/2010 |
| WO | 2010/014163 A1 | 2/2010 |
| WO | 2010/016928 A2 | 2/2010 |
| WO | 2011/022661 A2 | 2/2011 |
| WO | 2011/041484 A1 | 4/2011 |
| WO | 2011/069338 A1 | 6/2011 |
| WO | 2011077756 A1 | 6/2011 |
| WO | 2011/103798 A1 | 9/2011 |
| WO | 2011/103799 A1 | 9/2011 |
| WO | 2011/104035 A2 | 9/2011 |
| WO | 2011/149740 A1 | 12/2011 |
| WO | 2011/149812 A1 | 12/2011 |
| WO | 2011149811 A1 | 12/2011 |
| WO | 2012074983 A1 | 6/2012 |
| WO | 2012126394 A1 | 9/2012 |
| WO | 2013/016157 A1 | 1/2013 |
| WO | 2013/018774 A1 | 2/2013 |
| WO | 2013/027651 A1 | 2/2013 |
| WO | 2013/032890 A1 | 3/2013 |
| WO | 2013047679 A1 | 4/2013 |
| WO | 2013/074779 A1 | 5/2013 |
| WO | 2013/082246 A1 | 6/2013 |
| WO | 2013088856 A1 | 6/2013 |
| WO | 2013/116420 A1 | 8/2013 |
| WO | 2013/120721 A1 | 8/2013 |
| WO | 2013/130653 A2 | 9/2013 |
| WO | 2013/130665 A2 | 9/2013 |
| WO | 2013/130721 A1 | 9/2013 |
| WO | 2013136013 A2 | 9/2013 |
| WO | 2013184205 A1 | 12/2013 |
| WO | 2014/042244 A1 | 3/2014 |
| WO | 2014/097623 A1 | 6/2014 |
| WO | 2014/175144 A1 | 10/2014 |
| WO | 2014/180679 A1 | 11/2014 |
| WO | 2015/057552 A2 | 4/2015 |
| WO | 2015/057555 A1 | 4/2015 |
| WO | 2015/077179 A1 | 5/2015 |
| WO | 2015127483 A2 | 8/2015 |
| WO | 2015/175595 A1 | 11/2015 |
| WO | 2015/195419 A2 | 12/2015 |
| WO | 2015/195465 A1 | 12/2015 |
| WO | 2016/014937 A1 | 1/2016 |
| WO | 2016/028554 A1 | 2/2016 |
| WO | 2016/073539 A1 | 5/2016 |
| WO | 2016070048 A1 | 5/2016 |
| WO | 2016/174825 A1 | 11/2016 |
| WO | 2016/185934 A1 | 11/2016 |
| WO | 2016/191676 A1 | 12/2016 |

(56) References Cited

FOREIGN PATENT DOCUMENTS

| WO | 2017/030736 A1 | 2/2017 |
|---|---|---|
| WO | 2017/100646 A1 | 6/2017 |

OTHER PUBLICATIONS

Bahlawane; "Novel sol-gel process depositing a-Al2O3 for the improvement of graphite oxidation-resistance", Thin Solid Films, vol. 396, pp. 126-130, 2001.
Dessler et al; "Differences between films and monoliths of sol-gel derived aluminas", Thin Solid Films, vol. 519, pp. 42-51, 2010.
Fu et al, "Preparation of alumina films from a new sol-gel route" Thin Solid films 348, pp. 99-102 (1999).
Hauk "Sol-gel preparation of scratch-resistant Al2O3 coatings on float glass", Glass Science and Technology: Glastechnische Berichte, 72(12), pp. 386, 1999.
International Search Report and the Written Opinoin of the International Searching Authority; PCT/SU2015/035448; dated Sep. 18, 2015; 11 Pages.
International Search Report and Written Opinion PCT/US2016/034634 dated Nov. 2, 2016.
Oram et al; U.S. Appl. No. 14/932,411, filed Nov. 4, 2015, Titled "Deep Non-Frangible Stress Profiles and Methods of Making".
PCT/US2015/023507 Search Report, dated Oct. 2015.
PCT/US2015/034996 Search Report dated Jan. 4, 2016.
PCT/US2015/041976 Search Report dated Oct. 29, 2015.
PCT/US2015/058322 Search Report dated Jan. 8, 2016.
PCT/US2015/058919 Search Report dated Jan. 11, 2016.
Pflitsch et al; "Sol-gel deposition of chromium doped aluminum oxide films (Ruby) for surface temperature sensor application", Chem. Mater., vol. 20, pp. 2773-2778, 2008.
Stosser et al; "Magnetic Resonance investigation of the process of corundum formation starting from sol-gel precursors", J. Am. Ceram. Soc, vol. 88, No. 10, pp. 2913-2922, 2005.
English Translation of CN201580071968.6 Office Action dated Apr. 17, 2019, 17 Pages; Chinese Patent Office.
Abrams et al; "Fracture behavior of engineered stress profile soda lime silicate glass"; Journal of Non-Crystalline Solids; 321, (2003) 10-19.
Bansal et al; "Chapter 10: Elastic Properties" Handbook of Glass Properties; Elsevier; (1986) pp. 306-336.
Bouyne et al; "Fragmentation of thin chemically tempered glass plates"; Glass Technol., 2002, 43C, 300-2.
Brunkov et al; "Submicron-Resolved Relief Formation in Poled Glasses and Glass-Metal Nanocomposites"; Technical Physics Letters, 2008, vol. 34, No. 12 pp. 1030-1033.
Bubsey, R.T. et al, "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (Oct. 1992).
Corning leads $62M Investment in 'smart' glass maker view, Jun. 19, 2013; http://optics.org/news/4/6/27.
Corning, "Nook—Stress Profile Measurement", Corning Incorporated, 2019, 4 slides.
Declaration of Rostislav V. Roussev; 9 Pages; August 11, 2019.
Donald "Review Methods for Improving the Mechanical Properties of Oxide Glasses"; Journal of Materials Science 24 (1989) 4177-4208.
Dusil J. And Strnad Z., "Black colored glass ceramics based on beta-quartz solid solutions," Glass 1977: proceedings of the 11th International Congress on Glass, Prague, Czechoslovakia, Jul. 4-8, 1977, vol. 2, p. 139-149.
English Translation of CN2015800558699.9 Office Action dated Dec. 2, 2020; 17 Pages; Chinese Patent Office.
European Patent Application No. 15795287.0 Observations by third parties dated May 5, 2020; 10 Pages; European Patent Office.
Greaves et al; "Inorganic Glasses, Glass-Forming Liquids and Amorphizing Solids", Advances in Physics; vol. 56, No. 1, Jan.-Feb. 2007, 1166.
Green; "Section 2. Residual stress, brittle fracture and damage; Critical parameters in the processing of engineered stress profile glasses"; Journal of Non-Crystalline Solids, 316 (2003) 35-41.
Gulati, "Frangibility of tempered soda-lime glass sheet" Glass Processing Days, Sep. 13-15, 1997. pp. 72-76.
Guo Xingzhong Yang Hui Cao Ming, Nucleation and crystallization behavior of Li2O—Al2O3—SiO2 system glass-ceramic containing little fluorine and no-fluorine, J.Non-Cryst.Solids, 2005, vol. 351, No. 24-26, p. 2133-2137.
Hampshire; "Section 3. Oxynitride Glasses; Oxynitride Glasses, Their Properties and Crystallisation—A Review", Journal of Non-Crystalline Solids 316 (2003) p. 64-73.
International Search Report and Written Opinion of the International Searching Authority; PCT/US15/035448; dated Sep. 18, 2015; 10 Pages; European Patent Office.
Kitaigorodskii I.I. 'Sentyurin G.G.' 'Egorova L.S.', In: Sb.Nauchn. Rabot Belor.Politekhn.Inst.,Khimiya, Tekhnologiya Istoriya Stekla i Keramiki, 1960, No. 86, p. 38. (The Synthesis of Thermo-stable glasses) Abstract Only.
Le Bourhis; "Hardness"; Glass Mechanics and Technology; 2008; pp. 170-174.
Peitl et al; "Thermal Shock Properties of Chemically Toughened Borosilicate Glass"; Journal of Non-Crystallin Solids, 247, (1999) pp. 39-49.
Poumellec et al; "Surface topography change induced by poling in Ge doped silica glass films" ; 2003 OSA/BGPP 2003 MD 38.
Reddy, K.P.R. et al, "Fracture Toughness Measurement of Glass and Ceramic Materials Using Chevron-Notched Specimens," J. Am. Ceram. Soc., 71 [6], C-310-C-313 (1988).
Rusan et al; "A New Method for Recording Phase Optical Structures in Glasses" ; Glass Physics and Chemistry, 2010, vol. 36, No. 4, pp. 513-516.
Sglavo & Green, "Flaw-insensitive ion-exchanged glass: 11, Production and mechanical performance" J. Am. Ceram. Soc. 84(8) pp. 1832-1838 (2001).
Sglavo et al. "procedure for residual stress profile determination by vurbature measurements" Mechanics of Materias, 2005, 37(8) pp. 887-898.
Shen et al; "Control of concentration profiles in two step ion exchanged glasses"; Phys. Chem. Glasses, 2003 44 (4), 284-92.
Shen et al; "Variable-temperature ion-exchanged engineered stress profile (ESP) glasses"; J. Am. Ceram. Soc., 86 [11] 1979-81 (2003).
Smedskjaer "Effect of thermal history and chemical composition on hardness of silicate glasses"; Journal of Non-Crystalline Solids 356 (2010); pp. 893-897.
Takagi et al; "Electrostatic Imprint Process for Glass"; Applied Physics Express 1 (20008) 024003 published 2008 /R.C.B./.
Tang et al. "Methods for measurement and statistical analysis of the frangibility of strengthened glass" Frontiers in Materials, 2015 vol. 2, article 50. 8 pgs.
Tang, et al., "Automated Apparatus for Measuring the Frangibility and Fragmentation of Strengthened Glass", Experimental Mechanics (Jun. 2014) vol. 54 pp. 903-912.
Varshneya; "Fundamentals of Inorganic Glasses"; 2nd edition, Society of Glass Technology, 2006, pp. 513-521, XP002563094.
Zheng et al; "Effect of Y2O3 addition on viscosity and crystallizationof the lithium aluminosilicate glasses"; Thermochimica Acta 456 (2007) 69-74.
Zheng et al; "Structure and Properties of the Lithium Aluminosilicate Glasses with Yttria Addition"; vol. 22, No. 2 Wuhan University of Technology—(Abstract).
Zimmer, "Thin Glasses for Touch Display Technologies" Schott: glass made of ideas. Emerging Display Technologies Conference, Aug. 16-17, 2011. 17 slides.
Taiwanese Application No. 104136076; Office Action dated Dec. 22, 2020; 6 pages (English Translation Only) Taiwanese Patent Office.

(56) References Cited

OTHER PUBLICATIONS

Barnett Technical Services, "Surface Stress Meters", Available Online at <https://web.archive.org/web/20200925054825/https://barnett-technical.com/luceo/surface-stress/>, Retrieved on Sep. 25, 2020, 4 pages.
European Patent Application No. 15795287 Office Action a European Patent dated Mar. 4, 2021; 6 pages; European Patent Office.
Inaba et al., "Non-destructive Stress Measurement in Double Ion-Exchanged Glass Using Optical Guided-Waves and Scattered Light", Journal of the Ceramic Society of Japan 2017, vol. 125, No. 11, pp. 814-820.

* cited by examiner

DEEP NON-FRANGIBLE STRESS PROFILES AND METHODS OF MAKING

CROSS-REFERENCE TO RELATED APPLICATIONS

This application is a divisional application and claims the benefit of priority under 35 U.S.C. § 120 of U.S. application Ser. No. 14/932,411 filed on Nov. 4, 2015, which in turn, claims the benefit of priority under 35 U.S.C. § 119 of U.S. Provisional Application Ser. No. 62/074,872 filed on Nov. 4, 2014, the contents of each of which is relied upon and incorporated herein by reference in their entireties.

BACKGROUND

The disclosure relates to stress profiles in glasses. More particularly, the disclosure relates to glasses having deep compressive stress profiles. Even more particularly, the disclosure relates to glasses having deep compressive stress profiles and exhibiting non-frangible behavior.

Chemically strengthened glasses are widely used in displays for hand-held electronic devices such as phones, notebooks and the like. Chemical strengthening creates a compressive layer at the surface of the glass and a tensile region in the central portion of the glass. Compressive stress (CS) and depth of layer (DOL) are typically determined from surface stress measurements (FSM) using commercially available instruments such as, for example, the FSM-6000, surface stress meter manufactured by Luceo Co., Ltd. (Tokyo, Japan) or the like.

For strengthened glass articles in which the compressive stress layers extend to deeper depths within the glass, the FSM technique may suffer from contrast issues that affect the observed DOL. At deeper DOL values, there may be inadequate contrast between the TE and TM spectra, thus making the calculation of the difference between TE and TM spectra—and accurately determining the DOL—more difficult. Moreover, the FSM software analysis is incapable of determining the compressive stress profile (i.e., the variation of compressive stress as a function of depth within the glass). In addition, the FSM technique is incapable of determining the depth of layer resulting from the ion exchange of certain elements such as, for example, ion exchange of sodium for lithium, that are present in the glass.

SUMMARY

The present disclosure extends the range of possible compressive stress profiles. Modifications to metrology based on the Orihara FSM instrument have enabled measurement of are chemically strengthened glasses with "super-deep" depth of compressive layer DOL; i.e., glass samples having a depth of compressive layer of greater than about 120 µm and, in some embodiments, greater than about 140 µm with standard deviation around 4 µm, as determined by surface stress/FSM measurements (referred to herein as "FSM_DOL" or simply "DOL"). In some embodiments, the DOL may be about 186 µm with a standard deviation of about 10 µm have been obtained. The glasses are non-frangible—i.e., the glasses do not exhibit frangible (explosive or energetic fragmentation) behavior upon impact or insult.

Accordingly, in one aspect, a strengthened glass article is provided. The glass article has a thickness t and a compressive layer extending from a surface of the glass article to a depth of layer DOL of greater $0.1 \cdot t$. The glass article has a maximum compressive stress CS of greater than about 500 MPa at the surface, a stress profile having a spike region in a range from about 1 µm to about 30 µm. The stress profile in the spike region has a slope. The slope has an absolute value of greater than about 20 MPa/µm.

In another aspect, a glass article having a thickness t in a range from about 0.2 mm to about 1.5 mm, a compressive layer extending from a surface of the glass article to a depth of layer DOL or depth of compression DOC, and a tensile region under a physical center tension CT extending from the depth of layer or depth of compression to the center of the glass at t/2 is provided. The physical center tension CT is greater than $|-1.956 \times 10^{-16} x t^6 + 1.24274 \times 10^{-12} x t^5 - 3.09196 \times 10^{-9} x t^4 + 3.80391 \times 10^{-6} x t^3 - 2.35207 \times 10^{-3} x t^2 + 5.96241 \times 10^{-1} x t + 36.5994|$, and the glass article has a total elastic energy normalized per thickness of the glass $E_{total}$, wherein $(E_{total}/t) = 174.75$ J/m²·mm.

In yet another aspect, a glass article having a thickness t in a range from about 0.3 mm to about 1 mm, a compressive layer extending from a surface of the glass article to a depth of layer DOL or depth of compression DOC, and a tensile region under a physical center tension CT extending from the depth of layer or depth of compression to the center of the glass at t/2 is provided. The physical center tension CT is greater than $|-1.956 \times 10^{-16} x t^6 + 1.24274 \times 10^{-12} x t^5 - 3.09196 \times 10^{-9} x t^4 + 3.80391 \times 10^{-6} x t^3 - 2.35207 \times 10^{-3} x t^2 + 5.96241 \times 10^{-1} x t + 36.5994|$, and has an elastic energy stored in the interior of the sample in tension of $E_{interior}$, wherein $(E_{interior}/t) = 30$ J/m²·mm.

In another aspect, a glass article strengthened by a two-step ion exchange (IOX) process and having a stress profile is provided. The glass article has a thickness t in a range from about 0.4 mm to about 1 mm and a center at t/2, a compressive layer extending from a surface of the glass article to a depth of layer DOL or a depth of compression DOC, and a tensile region under a physical center tension CT extending from the depth of layer to the center of the glass article. The glass article has a compressive stress CS1 after the first ion exchange step at the surface of from 100 MPa to 400 MPa and, in some embodiments, from 150 MPa to 300 MPa, and a depth of layer FSM_DOL greater than $0.1 \cdot t$ or, in some embodiments, greater than $0.15 \cdot t$ following the first ion exchange step. The first ion exchange step is followed by a second ion exchange step after which the glass article has a compressive stress CS2 of greater than about than 500 MPa or, in some embodiments, greater than 700 MPa, at the surface and has a stress profile having a spike region in a range from about the surface to about 30 µm or, in some embodiments, to about 8µ-15 µm. The stress profile in the spike region has a slope, which has an absolute value of greater than about 20 MPa/µm.

A method of strengthening a glass article is also provided. The glass article has a thickness t and a center at t/2. The method comprises: ion exchanging the glass article in a first ion exchange bath comprising a potassium salt and at least 30 wt % of a sodium salt to form a compressive layer having a compressive stress CS1 at the surface of from about 100 MPa to about 400 MPa, the compressive layer extending from a surface of the glass article to a depth of layer FSM_DOL of greater than $0.1 \cdot t$, or depth of compression DOC, and a tensile region under a physical center tension CT extending from the depth of layer or depth of compression to the center of the glass article; and ion exchanging the glass article in a second ion exchange bath comprising at least 90 wt % of a potassium salt to form a spike region extending from the surface to about 30 µm below the surface. The spike region has a maximum compressive stress CS of greater than about 500 MPa at the surface, wherein the stress profile in the spike region has a slope, the slope having an absolute value of greater than about 20 MPa/μm.

These and other aspects, advantages, and salient features of the present disclosure will become apparent from the following detailed description, the accompanying drawings, and the appended claims.

DETAILED DESCRIPTION

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass article" and "glass articles" are used in their broadest sense to include any object made wholly or partly of glass. Unless otherwise specified, all compositions are expressed in terms of mole percent (mol %).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "substantially free of MgO" is one in which MgO is not actively added or batched into the glass, but may be present in very small amounts as a contaminant—e.g., less than about 0.1 mol %.

Figure 1:
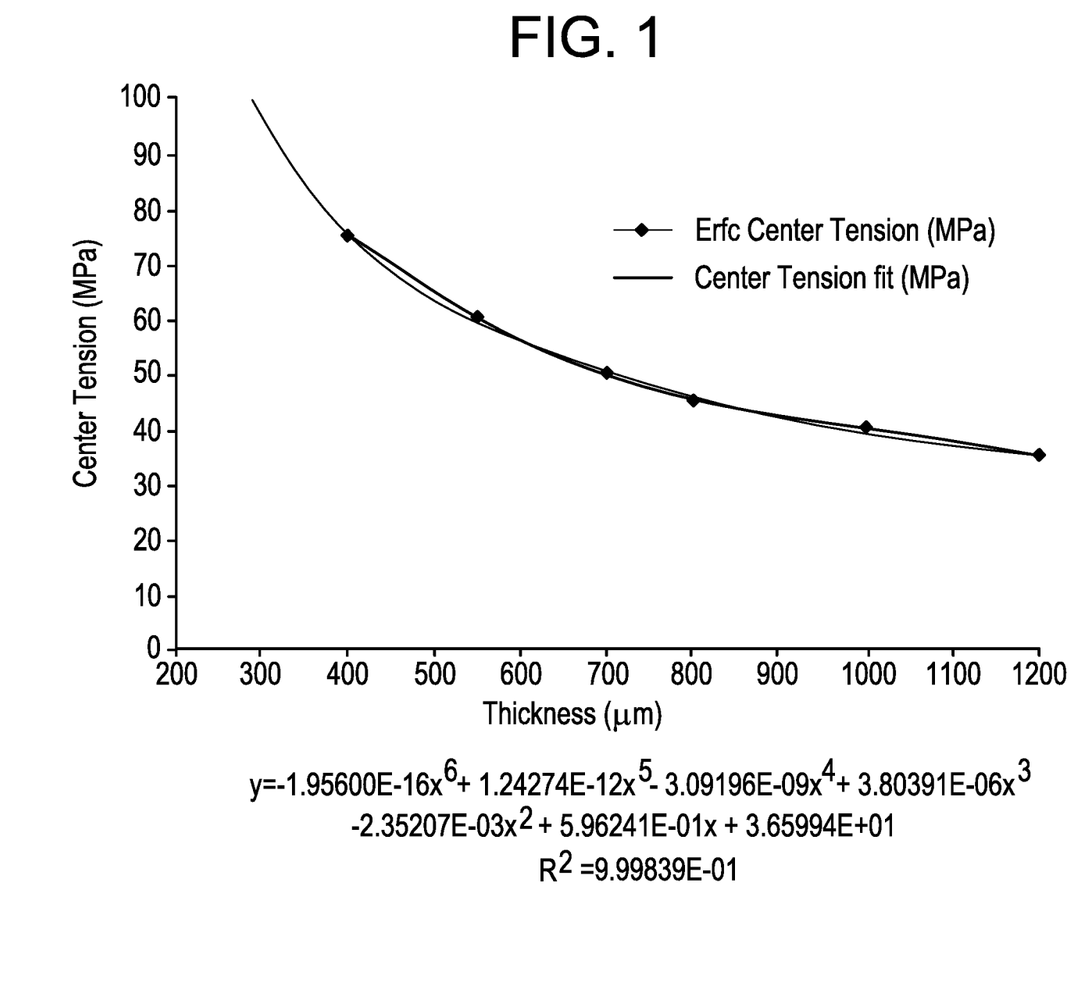
FIG. 1 is a plot of typical values of physical center tension (MPa) limits as a function of sample thickness.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Described herein are chemically strengthened glasses with "super-deep" DOL; i.e., glass samples having a depth of compressive layer of greater than about 120 μm and, in some embodiments, greater than about 140 μm, with a standard deviation around 4 μm, as determined by surface stress/FSM measurements (referred to herein as "FSM_DOL" or simply "DOL"). In some embodiments, the DOL may be about 186 μm with a standard deviation of about 10 μm.

The glasses described herein are ion exchangeable alkali aluminosilicate glasses, which, in some embodiments, are formable by down-draw processes, such as slot-draw, or fusion-draw processes that are known in the art. In particular embodiments, such glasses may have a liquidus viscosity of at least about 100 kiloPoise (kP), or at least about 130 kP. In one embodiment, the alkali aluminosilicate glass comprises $SiO_2$, $Al_2O_3$, $P_2O_5$, and at least one alkali metal oxide ($R_2O$), wherein $0.75 \leq [(P_2O_5$ (mol %)+$R_2O$ (mol %))/$M_2O_3$ (mol %)]$\leq 1.2$, where $M_2O_3=Al_2O_3+B_2O_3$. In some embodiments, the alkali aluminosilicate glass comprises or consists essentially of: from about 40 mol % to about 70 mol % $SiO_2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$ and, in certain embodiments, from about 40 to about 64 mol % $SiO_2$; from 0 mol % to about 8 mol % $B_2O_3$; from about 16 mol % to about 28 mol % $Al_2O_3$; from about 2 mol % to about 12 mol % $P_2O_5$; and from about 12 mol % to about 16 mol % $R_2O$. In some embodiments, 11 mol %$\leq M_2O_3 \leq 30$ mol %; in some embodiments, 13 mol %$\leq R_xO \leq 30$ mol %, where $R_xO$ is the sum of alkali metal oxides, alkaline earth metal oxides, and transition metal monoxides present in the glass; and in still other embodiments, the glass is lithium-free. These glasses are described in patent application Ser. No. 13/305,271, entitled "Ion Exchangeable Glass with Deep Compressive Layer and High Damage Threshold," filed Nov. 28, 2011, by Dana Craig Bookbinder et al. and claiming priority from U.S. provisional patent application No. 61/417,941, filed on Nov. 30, 2010, and having the same title, the contents of which are incorporated herein by reference in their entirety.

In certain embodiments, the alkali aluminosilicate glass comprises at least about 4 mol % $P_2O_5$, wherein ($M_2O_3$ (mol %)/$R_xO$(mol %))<1, wherein $M_2O_3=Al_2O_3+B_2O_3$, and wherein $R_xO$ is the sum of monovalent and divalent cation oxides present in the alkali aluminosilicate glass. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO. In some embodiments, the glass is lithium-free and consists essentially of from about 40 mol % to about 70 mol % $SiO_2$; from about 11 mol % to about 25 mol % $Al_2O_3$; from about 4 mol % to about 15 mol % $P_2O_5$; from about 13 mol % to about 25 mol % $Na_2O$; from about 13 to about 30 mol % $R_xO$, where $R_xO$ is the sum of the alkali metal oxides, alkaline earth metal oxides, and transition metal monoxides present in the glass; from about 11 to about 30 mol % $M_2O_3$, where $M_2O_3=Al_2O_3+B_2O_3$; from 0 mol % to about 1 mol % $K_2O$; from 0 mol % to about 4 mol % $B_2O_3$, and 3 mol % or less of one or more of $TiO_3$, MnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$, Cl, and Br; the glass is lithium-free; and $1.3<[(P_2O_5+R_2O)/M_2O_3]\leq 2.3$, where $R_2O$ is the sum of monovalent_cation oxides present in the glass. The glass is described in U.S. Pat. No. 9,156,724 by Timothy M. Gross, entitled "Ion Exchangeable Glass with High Crack Initiation Threshold," filed Nov. 15, 2012, and U.S. Pat. No. 8,756,262 by Timothy M. Gross, entitled "Ion Exchangeable Glass with High Crack Initiation Threshold," filed Nov. 15, 2012, both claiming priority to U.S. Provisional Patent Application No. 61/560,434 filed Nov. 16, 2011. The contents of the above patent and applications are incorporated herein by reference in their entirety.

Glass samples with super-deep DOL μm were chemically strengthened in ion exchange baths having different "poisoning" levels—i.e., baths of a potassium salt "poisoned" with a sodium salt), and a number of them were found not to exhibit frangible behavior (explosive and energetic fragmentation upon impact or insult, often delayed) despite exceeding what has been considered to be the center tension CT limit above which such behavior is typically observed, thus confirming that the total energy criteria drives frangibility in these cases. Accordingly, the glasses exhibit non-frangible behavior in a regime where such behavior is not expected.

Frangible behavior is characterized by at least one of: breaking of the strengthened glass article (e.g., a plate or sheet) into multiple small pieces (e.g., ≤1 mm); the number of fragments formed per unit area of the glass article; multiple crack branching from an initial crack in the glass article; violent ejection of at least one fragment to a specified distance (e.g., about 5 cm, or about 2 inches) from its original location; and combinations of any of the foregoing breaking (size and density), cracking, and ejecting behaviors. As used herein, the terms "frangible behavior" and "frangibility" refer to those modes of violent or energetic fragmentation of a strengthened glass article absent any external restraints, such as coatings, adhesive layers, or the like. While coatings, adhesive layers, and the like may be used in conjunction with the strengthened glass articles described herein, such external restraints are not used in determining the frangibility or frangible behavior of the glass articles.

Frangible behavior and non-frangible behavior of strengthened glass articles may be determined by a point impact test using an instrument such as, for example, a scribe with a tungsten carbide tip, that is delivered to the surface of the glass article with a force that is just sufficient to release the internally stored energy present within the strengthened glass article. That is, the point impact force is sufficient to create at least one new crack at the surface of the strengthened glass sheet and extend the crack through the compressive stress CS region (i.e., depth of layer) into the region that is under central tension CT.

Accordingly, the chemically strengthened glasses described herein are "non-frangible"—i.e., they do not exhibit frangible behavior as described hereinabove when subjected to impact by a sharp object.

Described herein are chemically strengthened glass articles for which FSM_DOL>0.1·t and, in some embodiments, FSM_DOL>0.15·t, where t is the thickness of the sample. The glasses are strengthened in an ion exchange bath containing a potassium salt that is "poisoned" with greater than about 30 wt % of a sodium salt such as $NaNO_3$. The thickness t is in a range from about 400 μm (0.4 mm) to about 2000 μm (2 mm).

Samples may also be strengthened using a two-step ion exchange (double IOX) process to further increase the compressive stress at the surface of the glass and thus create a compressive stress "spike" at the surface and extending to a depth of about 30 μm below the surface, and a "super-deep" DOL of about 150 μm without demonstrating frangibility.

Super-deep DOL samples using a double IOX process with a spike and FSM measured depth of layer FSM_DOL of greater than 120 μm, in some embodiments, ranging from about 140 μm to about 150 μm, and, in still other embodiments, possibly reaching FSM_DOL of at least about 186 μm are provided. These double ion-exchanged samples with a spike have a compressive stress maximum at in a range from about 800 MPa to about 900 MPa and are not frangible.

Compressive stress CS and depth of layer DOL are measured using those means known in the art. Such means include, but are not limited to, measurement of surface stress (FSM) using commercially available instruments such as the FSM-6000, manufactured by Luceo Co., Ltd. (Tokyo, Japan), or the like, and methods of measuring compressive stress and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method.

As used herein, the terms "DOL" and "FSM_DOL" refer to the depth of the compressive layer as determined by surface stress measurements.

For strengthened glass articles in which the compressive stress layers extend to deeper depths within the glass, the FSM technique may suffer from contrast issues that affect the observed DOL value. At deeper depths of compressive layer, there may be inadequate contrast between the TE and TM spectra, thus making the calculation of the difference between the spectra of bound optical modes for TM and TE polarization—and accurate determination the DOL—more difficult. Moreover, the FSM software analysis is incapable of determining the compressive stress profile (i.e., the variation of compressive stress as a function of depth within the glass). In addition, the FSM technique is incapable of determining the depth of layer resulting from the ion exchange of certain elements in the glass such as, for example, the ion exchange of sodium for lithium.

The DOL as determined by the FSM is a relatively good approximation for the depth of compression (DOC) when the DOL is a small fraction r of the thickness t and the index profile has a depth distribution that is reasonably well approximated with a simple linear truncated profile. When the DOL is a substantial fraction of the thickness, such as DOL≥0.1·t, then the DOC is most often noticeably lower than the DOL. For example, in the idealized case of a linear truncated profile, the relationship DOC=DOL·(1−r) holds, where r=DOL/t.

The depth of compression Physical_DOL, also known as IWKB_DOL or DOCL (depth of compression layer) is determined from the spectra of bound optical modes for TM and TE polarization by using the inverse Wentzel-Kramers-Brillouin (IWKB) method. As used herein, Physical_DOL refers to the depth at which the stress is effectively zero inside the glass. This Physical_DOL is typically less than the FSM_DOL measured by the FSM instrument for a single Ion exchange process. For double ion exchange processes, the measured FSM_DOL is not a reliable metric, due to the nature of the instrument and its processing algorithm.

The shape and values of the stress profile in an ion exchanged glass are limited by a known frangibility limit. This frangibility limit is usually expressed in terms of the center tension CT, which is the value of the tensile stress in the center of the glass at the position x, where x=thickness/2. The center tension CT naturally occurs due to the force balance of the stress induced by the sample during the IOX process. The integral or sum of the stress at each point in the compressive part of the profile has to be equal to the integral or sum of the stress at each point in the tensile part of the profile, so that the sample is flat and not curved.

If one assumes a single IOX (SIOX) profile, diffusion is guided by a classical complementary error function. It has been found that the physical CT varies with glass thickness as shown in FIG. 1.

In FIG. 1, typical values of the physical center tension limit found as a function of the thickness of the sample for a SIOX is shown. A curve can be fit to the data in FIG. 1 to determine other physical center tension values between thicknesses of 200 μm to 1200 μm. The following equation may then be used to describe how classical physical CT values vary with thickness t, expressed in microns:

$$CT = -1.956 \times 10^{-16} \times t^6 + 1.24274 \times 10^{-12} t \times^5 - 3.09196 \times 10^{-9} \times t^4 + 3.80391 \times 10^{-6} \times t^3 - 2.35207 \times 10^{-3} \times t^2 + 5.96241 \times 10^{-1} \times t + 36.5994 \quad (1).$$

Figure 2:
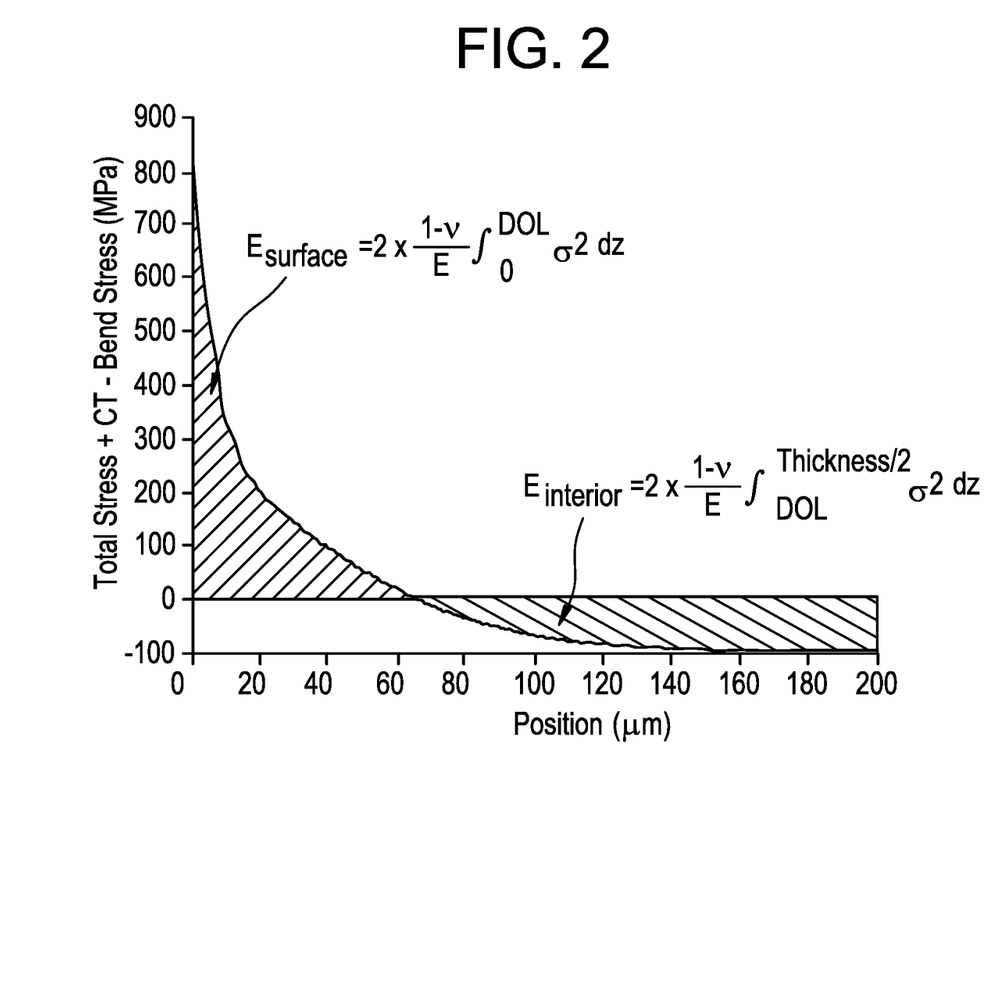
FIG. 2 is a plot of a stress profile of a double ion exchange sample.

When trying to find the ranges of values where a superdeep DOL sample can be made using a DIOX profile, another important parameter is the concept of elastic energy. A typical stress profile of a glass sample subjected to the double ion exchange (DIOX) process is schematically shown in FIG. 2. The energy stored in the surface is in compression and the energy stored in the interior of the sample is tension. The total energy $E_{total}$ is the sum of the energy in the surface plus the energy in the interior $E_{interior}$ of the sample. The factor of 2 in the equations shown in FIG. 2 indicates that both sides of the glass must be integrated and taken into account. The stress profile shown in FIG. 2 has a tail due to the first IOX step and a "spike" due to the second IOX step. The position of the spike occurs where the magnitude (i.e., absolute value) of the slope of the stress increases to a value of greater than about 20 MPa/μm.

The elastic energy stored by the stress profile is calculated according to the equation $$W_{el} = \frac{(1-v)}{E} \int \sigma^2 dx, \quad (2)$$

where $v$ is the Poisson ratio (0.22 for the example glass), E is Young's modulus (about 68 GPa for the example glass), and σ is the stress.

The elastic energy (per unit area of glass) in each compression region (one on each outer surface) is:

$$W_{el}^{comp} = \frac{1-v}{E} \int_0^{DOC} \sigma^2 dx. \quad (3)$$

The elastic energy in the tension region from the compression depth to the center of the glass substrate is:

$$W_{el}^{tens} = \frac{1-v}{E} \int_{DOC}^{0.5t} \sigma^2 dx. \quad (4)$$

The total elastic energy stored in the substrate is twice the sum of the elastic energy of the single compression region and the half tension region:

$$W_{el}^{tot} = 2(W_{el}^{comp} + W_{el}^{tens}) \quad (5).$$

Units for the quantities found in equations 2-5 are:
for stress: [σ]=MPa≡$10^6$ N/m$^2$;
for depth: [x]=μm=$10^{-6}$ m; and
for elastic energy (per unit substrate area):

$$[W_{el}] = MPa^{-1} * MPa * 10^6 \frac{N}{m^2} * 10^{-6} \text{ m} \equiv \frac{N*m}{m^2} \equiv \frac{J}{m^2} \equiv \frac{\mu J}{mm^2}.$$

Another metric is the elastic energy per unit substrate area per unit thickness of the substrate, expressed in terms of J/m$^2$ mm. This is a more universal parameter because it is independent of the thickness of the glass sample. The elastic energy per thickness of the substrate is valid from thicknesses ranging from 50 μm to 2000 μm.

In one embodiment, a frangibility criterion may be introduced in the form of a normalized total energy, which defined as:

$$W_{norm}^{tot} = \frac{W_{el}^{tot}}{\left(\frac{1-v}{E}\right)} = \int_0^{Thickness} \sigma^2, \quad (6)$$

Based on the above concepts, several double IOX experiments were performed on 0.8 mm thick alkali aluminosilicate glass, which is described in U.S. patent application Ser. No. 13/305,271, and has a nominal composition of about 57 mol % SiO$_2$, 0 mol % B$_2$O$_3$, about 17 mol % Al$_2$O$_3$, about 7% P$_2$O$_5$, about 17 mol % Na$_2$O, about 0.02 mol % K$_2$O, and about 3 mol % MgO. Here, detailed stress profile extraction using an IWKB-based algorithm was employed. The method is described in U.S. Pat. No. 9,140,543, entitled "Systems and Methods for Measuring the Stress Profile of Ion-Exchanged Glass," filed May 3, 2012, by Douglas C. Allan et al. and claiming priority from U.S. provisional patent application No. 61/489,800, filed on May 25, 2011, and having the same title, the contents of which are incorporated herein by reference in their entirety. The above procedure allowed the approximated physical stress profile to be extracted and the Physical_DOL or depth of compression layer (DOCL) where the stress effectively crosses from compressive stress to tensile stress at—and equals—zero to be pinpointed. By balancing tensile and compressive forces across the sample, the physical CT may be computed. In addition, it is also possible to approximate the elastic energies in compression and tension, as well as the total elastic energy. In some embodiments, the Physical_DOL is greater than 0.84 and, in some embodiments, greater than 0.12·t.

Examples of super-deep DOL obtained by the double or two-step IOX processes are listed in Tables 1a and 1 b. Table 1a includes parameters (bath composition, temperature, ion exchange time) for the first and second ion exchange baths and compressive stresses CS and depths of layer DOL, measured by FSM, following each ion exchange step. Table 1b lists sample frangibility; depth of compression DOC, compressive stress CS, and physical center tension CT as determined by the IWKB treatment; compressive, tensile, and total energies, and total energy normalized for thickness. The glass samples listed in the tables each had a thickness of 800 μm and the composition previously described hereinabove. All samples shown in Tables 1a and b are non-frangible, including some samples for which the physical CT as determined by the IWKB method is above the previously reported CT frangibility limit of $CT_{max}=-45$ MPa for 800 μm thick glass. These samples track the elastic energy in the sample more closely, and if the correct region of process parameters and stress profile targets of CS and DOL of the first and second ion exchange steps are targeted, super-deep depths of layer and compression that were previously believed to be unattainable may be achieved.

The depths of layer DOL1 as measured with the FSM-6000 instrument for the first ion exchange step were in a range from 136.6 μm to 180.4 μm and the compressive stresses CS1 were in a range from 189 MPa to 245 MPa. Following the second IOX step, the CS peak or spike was the range from 852 MPa to 890 MPa. The spike extends from the surface to a depth of about 10 μm to about 11 μm. The peak width may, in practice, be somewhat controlled depending on the immersion time in the second IOX bath. Peak widths from about 1 μm to 25 μm and, in some embodiments, up to about 30 μm are possible for the spike region, depending on the elastic energy stored in the sample.

Figure 3:
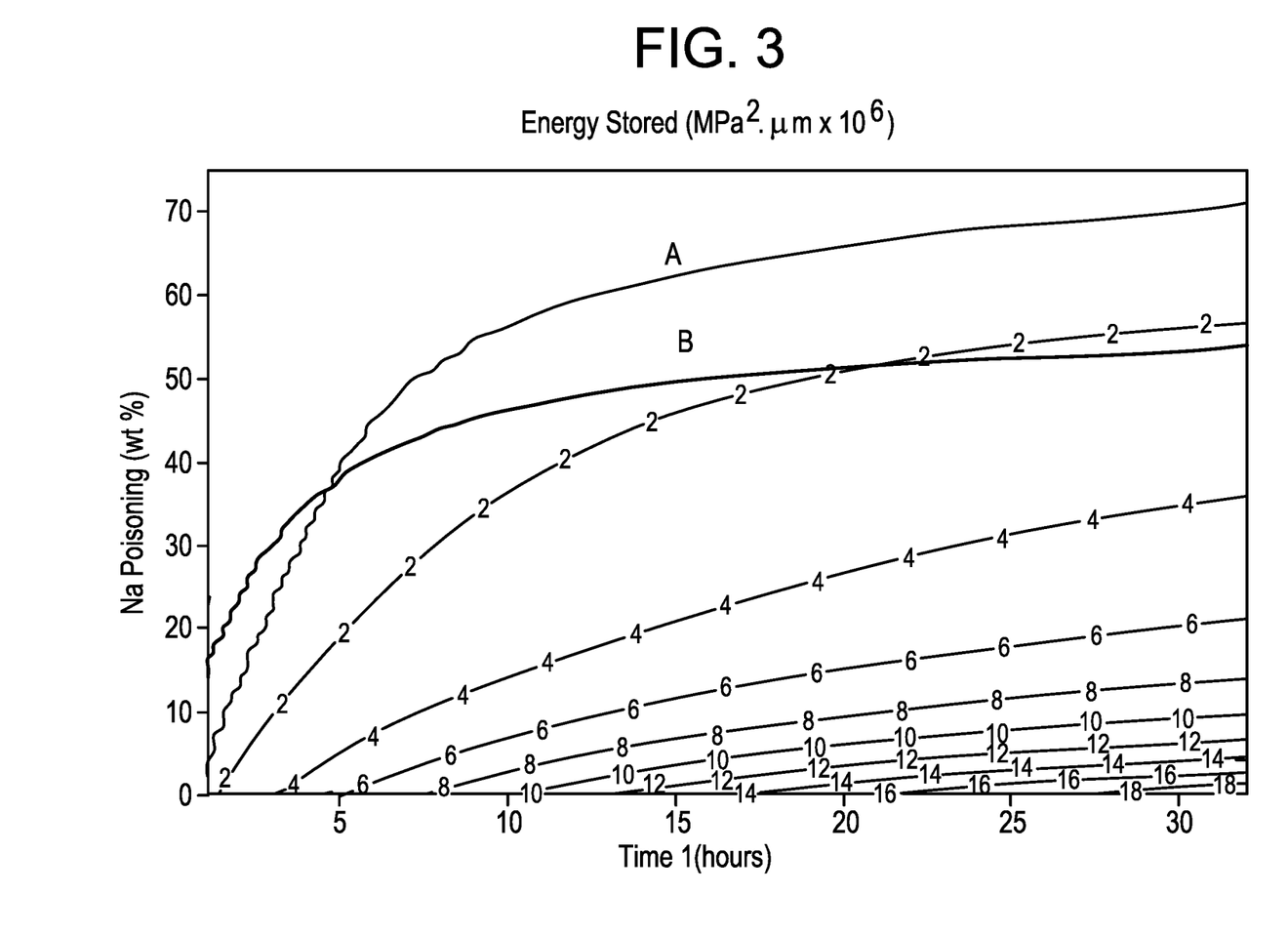
FIG. 3 is a map of the area of interest for an alkali aluminosilicate glass having a Poisson ratio ν=65 GPa and a Young's modulus E=65 GPa.

For glass samples having the above composition with 800 μm thickness, two regions of interest have been identified based on concepts of physical CT and elastic energy. The first region of interest is shown in FIG. 3, which is a map of an area of interest for a glass having a Poisson ratio ν=65 GPa and a Young's modulus E=65 GPa. The upper line A in FIG. 3 is the frangibility limit that has been believed to exist, where CT=−45 MPa for a 800 μm thick sample. Line B in FIG. 3 is the normalized total energy, which is the integral of the stress squared. Line B is the lower limit with a value of $E_{total}=11.65$ MPa$^2$·μm×$10^6$, and corresponds to a non-normalized total energy of $E_{total}=139.8$ J/m$^2$. Normalizing the thickness, $(E_{total}/t)=174.75$ J/m$^2$·mm for thickness t=0.8 mm, which is a more universal value that is thickness independent. The area of interest is the area between lines A and B and can be described to be an area where Physical TABLE 1a Ion exchange parameters for the first and second ion exchange baths and compressive stresses CS and depths of layer DOL, measured by FSM for double-IOX processes (DIOX) for alkali aluminosilicate glass samples having a thickness of 800 μm.

| | IOX step 1 | | | | | IOX step 2 | | | | |
|---|---|---|---|---|---|---|---|---|---|---|
| Sample | wt % Na | time (h) | Temp (° C.) | Mean CS1 (FSM) [MPa] | Mean DOL1 (FSM) [μm] | wt % Na | time (h) | Temp (° C.) | Mean CS1 (FSM) [MPa] | Mean DOL1 (FSM) [μm] |
| 1 | 57 | 15 | 460 | 201.5 | 136.6 | 0.5 | 0.25 | 390 | 201.5 | 136.6 |
| 2 | 57 | 17.5 | 460 | 196.7 | 148.7 | 0.5 | 0.25 | 390 | 196.7 | 148.7 |
| 3 | 57 | 20.1 | 460 | 195.8 | 154.8 | 0.5 | 0.25 | 390 | 195.8 | 154.8 |
| 4 | 57 | 26 | 460 | 194.2 | 163.8 | 0.5 | 0.25 | 390 | 194.2 | 163.8 |
| 5 | 57 | 28 | 460 | 192.8 | 176.6 | 0.5 | 0.25 | 390 | 192.8 | 176.6 |
| 6 | 57 | 32.1 | 460 | 189.1 | 180.4 | 0.5 | 0.25 | 390 | 189.1 | 180.4 |
| 7 | 49 | 15 | 460 | 245.5 | 143.8 | 0.5 | 0.25 | 390 | 245.5 | 143.8 |
| 8 | 49 | 17.25 | 460 | 242.0 | 157.0 | 0.5 | 0.25 | 390 | 242.0 | 157.0 |

TABLE 1b

Sample frangibility; depth of compression DOC, compressive stress CS, and physical center tension CT as determined by the IWKB treatment; compressive, tensile, and total energies, and total energy normalized for thickness, determined for the double ion exchanged samples listed in Table 1a.

| Sample | Frangible | IWKB DOC (μm) | IWKB CS (MPa) | IWKB CT (MPa) | Compressive Energy (J/m$^2$) | Tensile Energy (J/m$^2$) | Total Energy (J/m$^2$) | Total Energy (J/m$^2$ · mm) |
|---|---|---|---|---|---|---|---|---|
| 1 | no | 96.81 | 921.38 | −38.73 | 85.08 | 10.92 | 96.00 | 120.00 |
| 2 | no | 100.72 | 901.46 | −40.17 | 85.47 | 11.59 | 97.06 | 121.33 |
| 3 | no | 107.92 | 927.36 | −43.27 | 87.49 | 13.12 | 100.62 | 125.77 |
| 4 | no | 115.48 | 983.50 | −46.46 | 91.15 | 14.74 | 105.89 | 132.36 |
| 5 | no | 117.53 | 956.90 | −47.36 | 89.02 | 15.20 | 104.23 | 130.28 |
| 6 | no | 124.91 | 833.79 | −50.87 | 88.14 | 17.09 | 105.23 | 131.54 |
| 7 | no | 103.57 | 948.16 | −48.53 | 105.13 | 16.75 | 121.88 | 152.35 |
| 8 | no | 108.57 | 882.65 | −51.09 | 101.20 | 18.26 | 119.47 | 149.33 |

Figure 4:
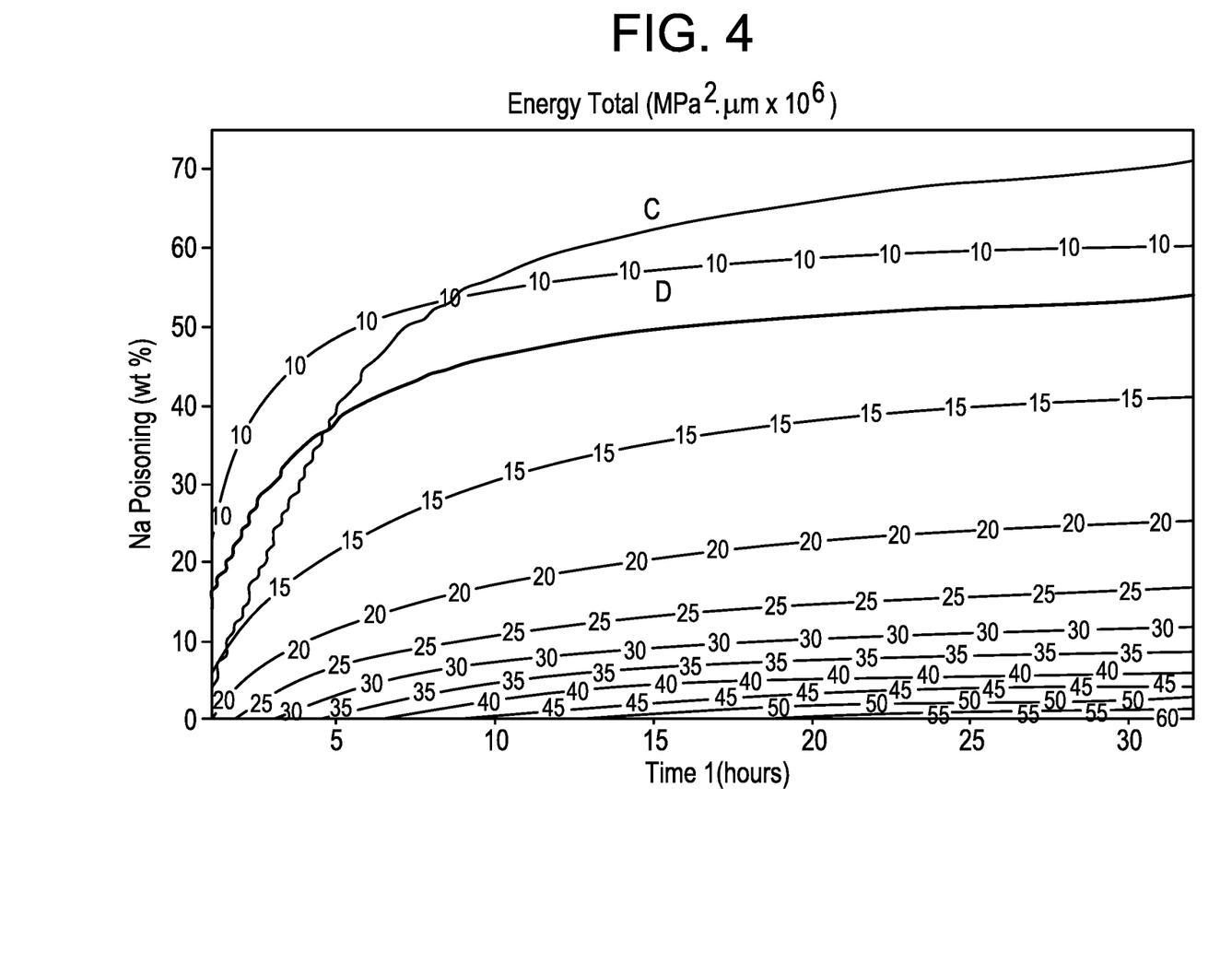
FIG. 4 is a second map of the area of interest for the case of an alkali aluminosilicate glass which has a Poisson ratio ν=65 GPa and a Young's modulus E=65 GPa.

CT>|45 MPa| and $E_{total}$<139.8 J/m² for a thickness t=800 µm. For a generic thickness, independent physical CT is greater than $$|-1.956\times10^{-16}\times t^6+1.24274\times10^{-12}\times t^5-3.09196\times10^{-9}\times t^4+3.80391\times10^{-6}\times t^3-2.35207\times10^{-3}\times t^2+5.96241\times10^{-1}\times t+36.5994|,$$

where t is the thickness in microns and $(E_{total}/t)$=174.75 J/m²·mm, where t is the same thickness, expressed in millimeters, for any dual IOX profile. The parameters described by the area between lies A and B in FIG. 3 describe the poisoning level and ion exchange time of the first IOX step. The second region of interest can be visualized with the help of FIG. 4, which shows a map of an area of interest for the glasses described herein having a Poisson ratio ν=65 GPa and a Young's modulus E=65 GPa. The upper line C is the fragility limit that has been believed to exist, where CT=−45 MPa for a 800 µm thick sample. Line D is the normalized energy stored in the interior $E_{interior}$ of the sample that is in tension, which is the integral of the stress squared from the point where the stress crosses zero to the center of the sample and multiplied by 2 to take into account both sides of the sample. Line D in FIG. 4 is the lower limit with a value of $E_{interior}$=2 MPa²·µm×10⁶, which corresponds to a non-normalized total energy of $E_{interior}$=24 J/m². Normalizing the thickness will result in $(E_{interior}/t)$=30 J/m²·mm for a thickness t=800 µm, which is a more universal value that is independent of thickness. The area of interest to be claimed is the area between lines C and D can be described as an area where CT is greater than the equations included in FIG. 1 and $(E_{interior}/t)$<30 J/m²·mm, which is valid for most thicknesses. Alternatively, the parameters describe in the area between lines C and D of FIG. 4 describe poisoning levels and ion exchange times of the first IOX step. This area again illustrates the area of interest between limit lines C and black D and can be described to be an area where: Physical CT>|145 MPa| and $E_{interior}$<24 J/m² for a thickness t=800 µm. Alternatively, for a generic thickness, independent physical CT>|−1.956×10⁻¹⁶×t⁶+1.24274×10⁻¹²×t⁵−3.09196×10⁻⁹×t⁴+3.80391×10⁻⁶×t³−2.35207×10⁻³×t²+5.96241×10⁻¹×t+36.5994|, where t is the thickness in microns and $(E_{interior}/t$ (mm))=30 J/m²·mm for any dual or two-step IOX profile.

Figure 5:
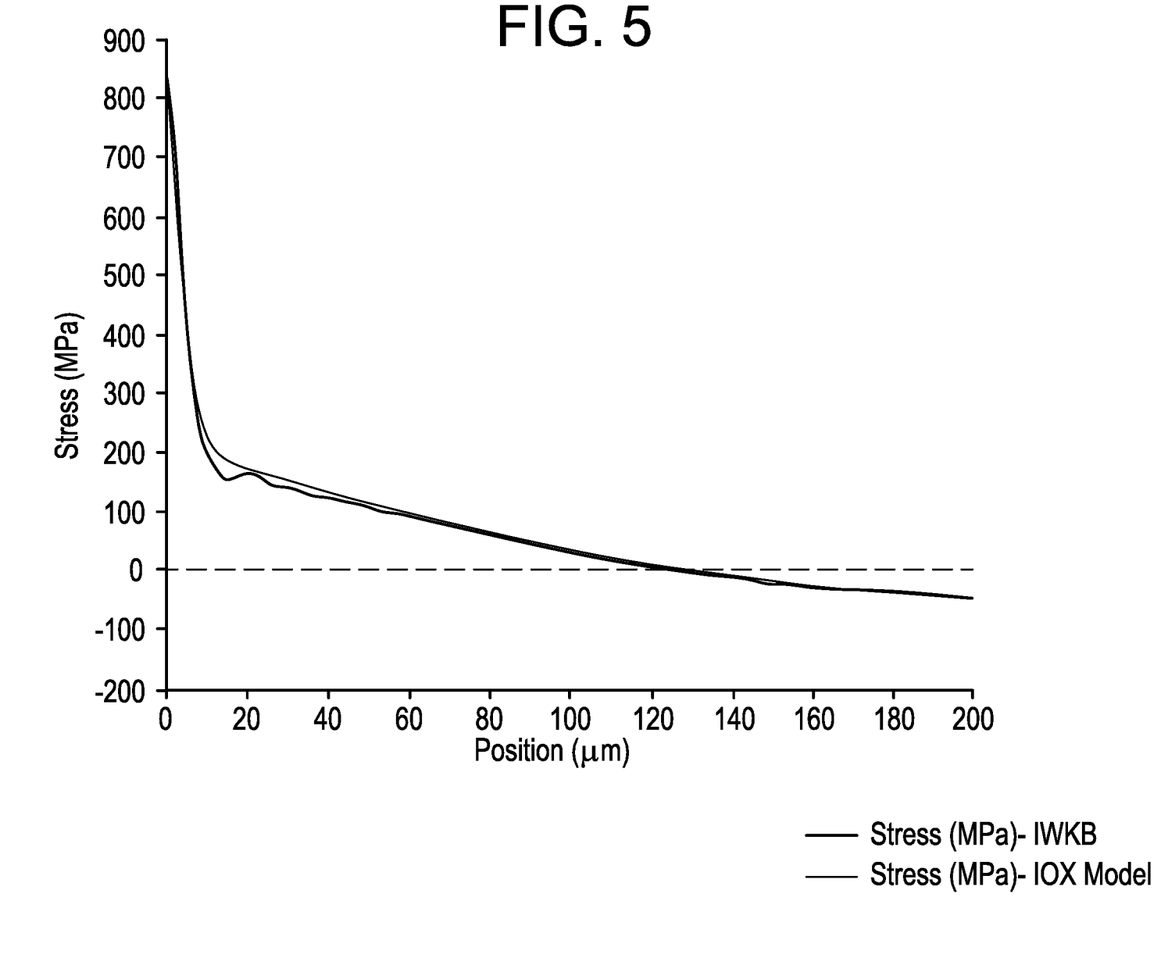
FIG. 5 is an example of a compressive stress profile for a non-frangible glass sample strengthened using a first ion exchange step of 32.1 hours at a temperature of 460° C. in a bath containing 57 wt % $NaNO_3$ and 53 wt % $KNO_3$.

Additional non-frangible samples having super-deep DOL have also been obtained using longer IOX times, as shown in FIG. 5, which shows an example of a super-deep IOX non-frangible stress profile obtained with a first IOX step of 32.1 hours at a temperature of 460° C. using a bath containing 57 wt % of NaNO₃ and the remaining 53 wt % being KNO₃. This is followed by second IOX of 15 minutes (0.25 hours) at a temperature of 390° C. in a bath containing 0.5 wt % NaNO₃+0.5 wt % of silicic acid+99% KNO₃ to achieve a spike. An inverse-WKB (IWKB) procedure was used to retry the approximated stress profile. An approximate finite-difference IOX model was also used, resulting in good agreement between theory and measurements. The depth of compression layer DOCL where the stress crosses zero as pointed out by the IWKB and IOX model was about 130 µm. In this case, the values obtained with the FSM-6000 yielded CS=890.3 MPa and DOL=180.4 µm. The range of values between DOL=120 µm and DOL=200 µm and, in some embodiments, between DOL=140 µm to 150 µm, can be deemed super-deep DOL samples. This super-deep IOX stress profile again is non-frangible.

Figure 6:
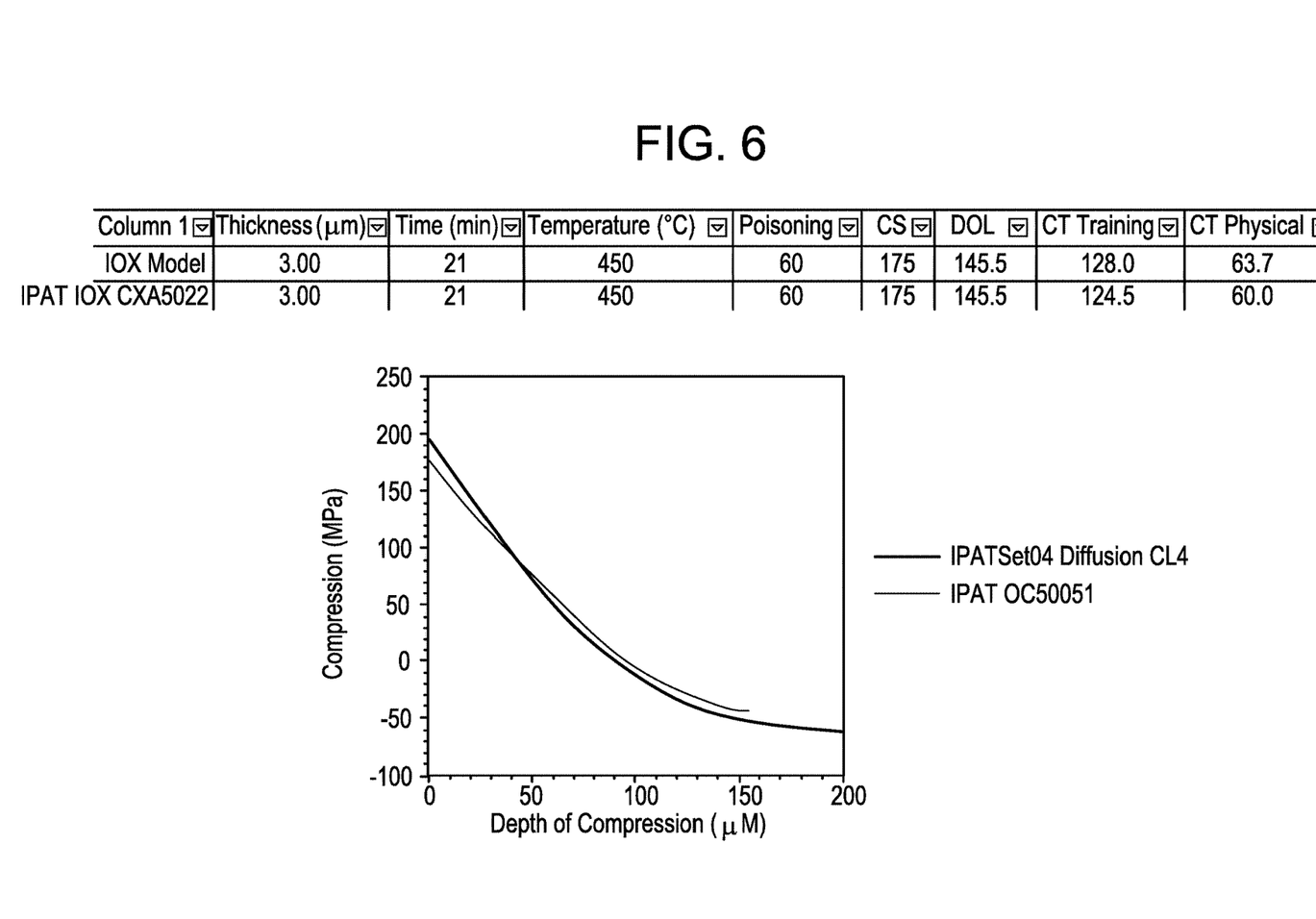
FIG. 6 is an example of a compressive stress profile for a glass having a thickness of 500 μm.

Other examples of super-deep IOX profiles were also obtained at a thickness of 500 µm, where a non-frangible stress profile was made after a first IOX step of 21 hours at 460° C. in a bath containing 60% NaNO₃ and 40% KNO₃, resulting in an FSM-6000 DOL in the 146-149 µm range and a CS of 177 MPa. The IWKB procedure was used to characterize the stress profile with a measured DOCL of 95.8 µm, CT of 60 MPa, $E_{interior}$ of 10.5 J/m² or $(E_{interior}/t)$ of 21 J/m²·m and total energy $E_{total}$ of 30 J/m² or $(E_{total}/t)$ of 60 J/m²·mm well below the upper limit of 174.75 J/m²·mm. This example is illustrated in FIG. 6. A DIOX stress profile, which includes a spike while maintaining the super-deep DOL as described in the examples above, may be designed based on this example. For example, a DIOX process with a first step ion-exchange at 460° C. using a NaNO₃/KNO₃ ion exchange bath having a slightly higher level (61 wt %) of NaNO₃ with a duration of 30 hours, combined with the spike process described above, may, for example, be used for 500 µm thick glass to obtain a non-frangible glass having a physical center tension CT of 96.9 MPa, total energy $(E_{total}/t)$ of 173.8 J/m²·mm, a FSM-6000 DOL of 194 µm, DOCL of 91.4 µm, and CS of 823 MPa. In another embodiment of the DIOX process, a first DOX step of 30 hours at 460° C. in a NaNO₃/KNO₃ ion exchange bath containing 65 wt % NaNO₃, combined with the spike process described above results in a non-frangible glass having a physical center tension CT of 85 MPa, a $E_{interior}/t$ of 29.4 J/m²·m, a total energy $E_{total}/t$ of 164 J/m²·mm, a FSM-6000 DOL of 194 µm, DOCL of 88.4 µm, and CS of 835 MPa.

In another aspect a method of strengthening a glass article having a thickness t is provided. The method comprises a step in which the glass article is ion exchanged in a first ion exchange bath comprising a potassium salt and at least 30 wt % of a sodium salt to form a compressive layer extending from a surface of the glass article to a depth of layer FSM_DOL of greater than 0.1·t, or a depth of compression DOC and a tensile region under a physical center tension CT extending from the depth of layer or depth of compression to the center of the glass at t/2. The compressive layer has a compressive stress CS1 at the surface from about 100 MPa to about 400 MPa. In a second step, the glass article is ion exchanged in a second ion exchange bath comprising at least 90 wt % of a potassium salt to form a spike region extending from the surface to a depth in a range from about 1 µm to about 30 µm below the surface. The spike region has a maximum compressive stress CS of greater than about 500 MPa at the surface, and the stress profile in the spike region has a slope having an absolute value of greater than about 20 MPa/µm. The glass article strengthened according to this method is non-frangible.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure and appended claims

The invention claimed is:

1. A method of strengthening a glass article having a thickness t and a stress profile, the method comprising:
   a. ion exchanging the glass article in a first ion exchange bath, the first ion exchange bath comprising a potassium salt and at least 30 wt % of a sodium salt, to form a compressive layer having a compressive stress CS1 at the surface of from about 100 MPa to about 400 MPa, the compressive layer extending from a surface of the glass article to a depth of layer FSM_DOL of greater than 0.1·t, or depth of compression DOC, and a tensile region under a physical center tension CT extending from the depth of layer or depth of compression to the center of the glass at t/2; and b. ion exchanging the glass article in a second ion exchange bath, the second ion exchange bath comprising at least 90 wt % of a potassium salt, to form a spike region extending from the surface to a depth in the range of from about 1 µm to about 30 µm below the surface, the spike region having a maximum compressive stress CS of greater than about 500 MPa at the surface, wherein the stress profile in the spike region has a slope, the slope having an absolute value of greater than about 20 MPa/µm.

2. The method of claim 1, wherein the glass article is non-frangible after ion exchanging in the second ion exchange bath.

3. The method of claim 1, wherein 1 the compressive layer has a Physical_DOL of greater than 0.12·t after ion exchanging in the second ion exchange bath.

4. The method of claim 1, wherein the maximum compressive stress CS is greater than about 700 MPa.

5. The method of claim 1, wherein the spike region extends from the surface to a depth in a range from about 8 µm to about 15 µm below the surface.

6. The method of claim 1, wherein the thickness t is 0.8 mm, the depth of layer DOL is greater than about 120 µm, and the maximum compressive stress is greater than about 700 MPa.

7. The method of claim 1, wherein the glass article comprises an alkali aluminosilicate glass.

8. The method of claim 7, wherein the alkali aluminosilicate glass comprises at least about 4 mol % $P_2O_5$ and from 0 mol % to about 5 mol % $B_2O_3$, wherein $1.3 < [(P_2O_5 + R_2O)/M_2O_3] \leq 2.3$, where $M_2O_3 = Al_2O_3 + B_2O_3$, and $R_2O$ is the sum of monovalent cation oxides present in the alkali aluminosilicate glass.

9. The method of claim 8, wherein the glass comprises from about 40 mol % to about 70 mol % $SiO_2$; from about 11 mol % to about 25 mol % $Al_2O_3$; from 0 mol % to about 5 mol % $B_2O_3$; from about 4 mol % to about 15 mol % $P_2O_5$; from about 13 mol % to about 25 mol % $Na_2O$; and from 0 mol % to about 1 mol % $K_2O$.

10. The method of claim 8, wherein 11 mol % $\leq M_2O_3 \leq$ 30 mol %.

11. The method of claim 8, wherein $R_xO$ is the sum of alkali metal oxides, alkaline earth metal oxides, and transition metal monoxides present in the glass, and wherein 13 mol % $\leq R_xO \leq$ 30 mol %.

12. The method of claim 7, wherein the glass article is lithium-free.

* * * * *

UNITED STATES PATENT AND TRADEMARK OFFICE
CERTIFICATE OF CORRECTION

PATENT NO. : 11,021,393 B2
APPLICATION NO. : 16/296773
DATED : June 1, 2021
INVENTOR(S) : Oram et al.

It is certified that error appears in the above-identified patent and that said Letters Patent is hereby corrected as shown below:

On the Title Page

On page 3, in Column 1, item (56), U.S. PATENT DOCUMENTS, Line 52, delete "Bersano" and insert -- Bersano et al. --, therefor.

On page 5, in Column 1, item (56), Other Publications, Line 11, delete "Opinoin" and insert -- Opinion --, therefor.

On page 5, in Column 2, item (56), Other Publications, Line 40, delete "vurbature" and insert -- curvature --, therefor.

On page 5, in Column 2, item (56), Other Publications, Line 40, delete "Materias," and insert -- Materials, --, therefor.

On page 5, in Column 2, item (56), Other Publications, Lines 59-60, delete "crystallizationof" and insert -- crystallization of --, therefor.

In the Claims

In Column 13, Line 15, Claim 3, delete "1 the" and insert -- the --, therefor.

Signed and Sealed this
Fifth Day of April, 2022

Drew Hirshfeld
*Performing the Functions and Duties of the
Under Secretary of Commerce for Intellectual Property and
Director of the United States Patent and Trademark Office*